US012745748B2

(12) United States Patent
Berk et al.

(10) Patent No.: US 12,745,748 B2
(45) Date of Patent: Sep. 29, 2026

(54) PET CARRIER

(71) Applicant: Miethner Creative Group LLC, Oceanside, NY (US)

(72) Inventors: Ian Berk, Oceanside, NY (US); Emily Miethner, Oceanside, NY (US)

( * ) Notice: Subject to any disclaimer, the term of this patent is extended or adjusted under 35 U.S.C. 154(b) by 0 days.

(21) Appl. No.: 18/407,559

(22) Filed: Jan. 9, 2024

(65) Prior Publication Data

US 2024/0224931 A1 Jul. 11, 2024

Related U.S. Application Data

(60) Provisional application No. 63/437,833, filed on Jan. 9, 2023.

(51) Int. Cl.
*A01K 1/02* (2006.01)
*A47C 31/08* (2006.01)

(52) U.S. Cl.
CPC .......... *A01K 1/0254* (2013.01); *A01K 1/0272* (2013.01); *A01K 1/029* (2013.01); *A47C 31/08* (2013.01)

(58) Field of Classification Search
CPC .... A01K 1/029; A01K 1/0254; A01K 1/0272; A47C 31/08
USPC .............................................. 24/429; 119/497
See application file for complete search history.

(56) References Cited

U.S. PATENT DOCUMENTS

| | | | | | |
|---|---|---|---|---|---|
| 2,131,211 | A * | 9/1938 | Bechik | A47C 31/08 | 16/444 |
| 2,359,193 | A * | 9/1944 | Bechik | A47C 31/08 | 16/444 |
| 4,153,146 | A * | 5/1979 | Patton | A45C 7/0068 | D3/902 |
| 4,597,605 | A * | 7/1986 | Gilbert | A47C 7/021 | 297/229 |
| 4,843,662 | A * | 7/1989 | Handelman | A47C 7/021 | 297/382 |
| 5,203,041 | A * | 4/1993 | Alonso | A47C 17/82 | 5/420 |
| 5,941,195 | A * | 8/1999 | Martz | A45C 9/00 | 119/497 |
| 6,446,577 | B1 * | 9/2002 | Salahor | A01K 1/0254 | 119/470 |
| D484,350 | S * | 12/2003 | Miller | D6/601 | |
| 7,111,714 | B1 * | 9/2006 | Bell, III | A43B 23/26 | 190/110 |
| 7,210,426 | B2 * | 5/2007 | Yeung | A01K 1/0254 | 119/497 |
| D578,430 | S * | 10/2008 | Ball | D11/221 | |
| D584,012 | S * | 12/2008 | Abernathy | D6/601 | |
| D621,101 | S * | 8/2010 | Hu | D30/109 | |
| 8,171,888 | B2 * | 5/2012 | Chou | A01K 1/0254 | 119/497 |
| D662,264 | S * | 6/2012 | Chau | D30/109 | |
| D717,503 | S * | 11/2014 | Diskin | D6/601 | |
| D808,084 | S * | 1/2018 | Lu | D30/109 | |

(Continued)

*Primary Examiner* — Christopher D Hutchens
(74) *Attorney, Agent, or Firm* — Bay State IP, LLC

(57) ABSTRACT

A pet carrier is disclosed, wherein the pet carrier is made from durable padding, fabric, and mesh and includes a main cavity where a pet is housed. with a window made of breathable mesh. Additionally, the pet carrier includes a back flap configured to dynamically open and close by unzipping the back opening zip; the back opening is further secured by a snap mechanism.

5 Claims, 8 Drawing Sheets

(56) References Cited

U.S. PATENT DOCUMENTS

| | | | | |
|---|---|---|---|---|
| 10,251,369 | B1 * | 4/2019 | Rozsa | A45C 13/001 |
| 10,772,288 | B1 * | 9/2020 | Sandiford | A01K 1/0272 |
| 11,399,504 | B1 * | 8/2022 | Edmonds | A01K 1/0245 |
| 11,678,642 | B2 * | 6/2023 | Lin | A01K 1/0254 119/453 |
| 2003/0127060 | A1 * | 7/2003 | Yeung | A01K 1/0254 119/497 |
| 2005/0211175 | A1 * | 9/2005 | Johnson | A01K 1/0353 119/28.5 |
| 2006/0059628 | A1 * | 3/2006 | Hamilton | A47C 4/52 5/653 |
| 2008/0072837 | A1 * | 3/2008 | Redzisz | A01K 1/0254 119/474 |
| 2010/0000472 | A1 * | 1/2010 | Siklosi | A01K 1/0272 119/497 |
| 2010/0175633 | A1 * | 7/2010 | Krauss | A01K 1/0254 119/497 |
| 2013/0048457 | A1 * | 2/2013 | Sbordoni | A01K 1/0254 190/115 |
| 2016/0113365 | A1 * | 4/2016 | Lank | A45C 3/00 383/40 |
| 2018/0359990 | A1 * | 12/2018 | Graham | A01K 1/0272 |
| 2019/0313597 | A1 * | 10/2019 | Chen | A01K 1/0254 |
| 2022/0361440 | A1 * | 11/2022 | Gordon, III | A01K 1/029 |
| 2023/0028775 | A1 * | 1/2023 | Beermann | A01K 1/029 |

* cited by examiner

PET CARRIER

CROSS REFERENCE TO RELATED APPLICATION

This application claims the benefit of and takes priority from U.S. Provisional Patent Application Ser. No. 63/437,833 filed on Jan. 9, 2023, the contents of which are herein incorporated by reference.

FIELD OF INVENTION

The present invention refers to a device to carry small pets with an individual as they travel outside the home.

BACKGROUND OF THE PRIOR ART

Over the years, many different types of pet carriers (e.g., cages, containers, and bags) have been employed by pet owners to transfer their pets. While these traditional pet carriers are capable of effectively transferring pets from one location to another, they typically do so in a manner that is uncomfortable for the pets. Accordingly, what is needed is an enhanced pet carrier that accommodates the needs of both pet owners and pets alike.

Within the concurrent art various devices exist designed to carry one's pets. One such system illustrates an enclosure for small animals which is wearable on the front or back of an animate bearer wherein straps are attached to a solid base upon which a complete enclosure is fastened and the straps allow the pet enclosure to be suspended from the shoulders and waist of a bearer, fully freeing the arms and hands.

Another system illustrates a wearable, multi-positional apparatus and method for transporting an animal horizontally in an adjustable, body conforming apparatus worn about the human torso and the carrier consists of a convex shaped main body panel bound at its perimeter by a flexible, semi-rigid binding material.

Another system illustrates a child or animal carrier and a method of carrying a child or animal on the user's body. The carrier has two loops joined together by a connecting device with an optional sash. The method of carrying the child or animal involves wearing the loops and placing the child or animal in the loops in a variety of positions.

An additional system illustrates a pet carrier for use in transporting pets within the passenger compartments of an aircraft includes selectively closeable windows formed from mesh fabric. In this system, a fully openable end and fully openable side are illustrated for providing access to the interior of the pet carrier, an access port in the top having a full length double zipper closure and a rotatable locking member for securing the access port in the closed condition, a multifunction strap securable to the opposite ends of the pet carrier for use as a shoulder strap and securable to one end of the pet carrier for use as a pulling strap; individually removable rollers supporting the pet carrier for rolling movement over an underlying surface; and a removable floor.

Another system discloses a detachable pet carrier for housing a pet that allows the pet to rest on one or more of its interior surfaces. The pet carrier may include a roof that provides shelter for the rest area in the pet carrier's deployed configuration. The pet carrier may also include one or more bolsters on one or more of its interior surfaces to better define the boundaries of the rest area in the pet carrier's deployed configuration. The pet carrier may also include one or more pickets on its interior and or exterior surfaces.

SUMMARY OF THE INVENTION

The instant apparatus and system, as illustrated herein, is clearly not anticipated, rendered obvious, or even present in any of the prior art mechanisms, either alone or in any combination thereof. A versatile system, method and series of apparatuses for creating and utilizing systems for animal transportation is disclosed. Thus the several embodiments of the instant apparatus are illustrated herein.

The present invention provides an apparatus for transport and care of small pets. The instant apparatus provides an enhanced pet carrier that accommodates the needs both of the pet and the pet owners alike.

The reason for this present apparatus is to provide a housing for carrying small pets outside the home while keeping them safe inside the secured, wearable apparatus. The apparatus benefits the pet owner in that it can easily carry the animal while being hands free and the pet remains comfortably within. Moreover, this device will allow one to take a small pet outside to explore open spaces or to simply take the animal to a desired location.

The instant apparatus accomplishes numerous tasks, including safe transport of the animal, yet allowing for animal freedom and comfort. Additionally, the instant apparatus is modeled to include a removable and replaceable waterproof bed that sits at the bottom of the pet carrier. There are multiple configurations of the handle which can be modified to be worn as a backpack. The back wall dynamically unzips and unfolds to lay flat to be used as a pet pad. There are multiple areas where the backpack may be opened to the cavity of the device wherein the pet may be placed inside. There is also mesh and plenty of air ways to allow the pet to sit comfortably inside the backpack while it is being carried to the desired location.

This device makes carrying the small pet as comfortable as possible to allow for as many adventures as possible with the beloved animal.

BRIEF DESCRIPTION OF THE DRAWINGS

Advantages of the present device will be apparent from the following brief description of exemplary embodiments thereof; the description should be considered in conjunction with the accompanying drawings.

DETAILED DESCRIPTION OF THE SEVERAL EMBODIMENTS

The detailed description set forth below is intended as a description of presently preferred embodiments of the system and does not represent the only forms in which the present system may be construed and/or utilized. The description sets forth the functions and the sequence of the steps for producing the system and accompanying apparatus. However, it is to be understood that the same or equivalent functions and sequences may be accomplished by different embodiments and also intended to be encompassed with the scope of the system.

Figure 1:
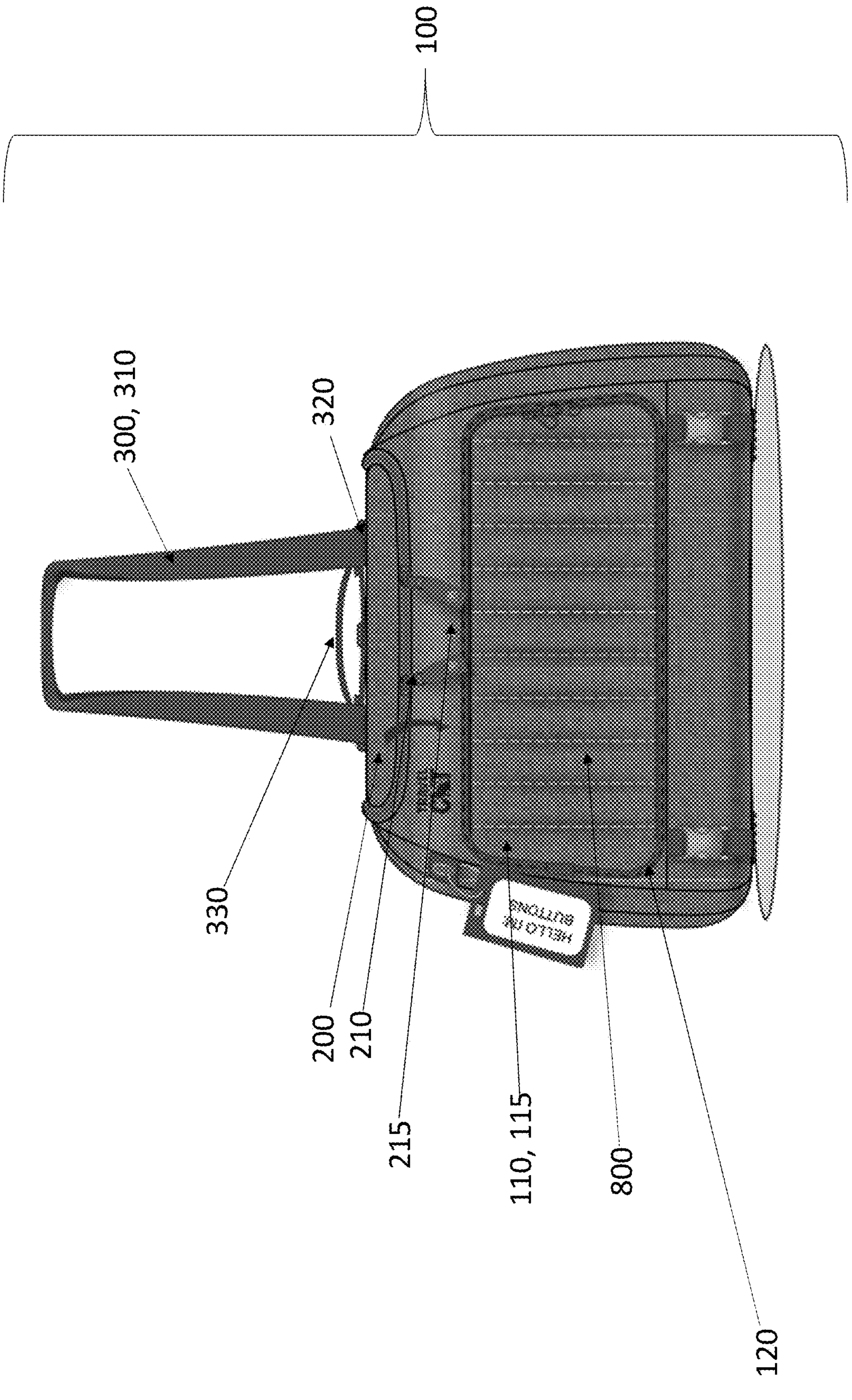
FIG. 1 is a front perspective view of a preferred embodiment of the present apparatus with a fully padded structure, a front window curtain, a back flap, a webbing handle, and a number of air holes.

FIG. 1 shows a preferred embodiment of a pet carrier 100 wherein the pet carrier 100 is made from durable padding, fabric, and mesh and comprises a main cavity 800 where a pet is housed. In a preferred embodiment, the pet carrier 100 comprises a window 110 made of breathable mesh. The window 110 may be covered by a window curtain 115 made of breathable fabric. The window 110 dynamically opens by unzipping a main zip opening 120.

The pet carrier 100 further comprises a back flap 200 configured to dynamically open and close by unzipping the back opening zip 210. The back opening 210 is further secured by a snap mechanism 215.

The pet carrier 100 further comprises a webbing handle 300. The webbing handle 300 is configured to dynamically adjust to the user's preference of length. The webbing handle 300 is comprised of an adjustable strap 310, a pass through 320, and a handle 330.

Figure 2:
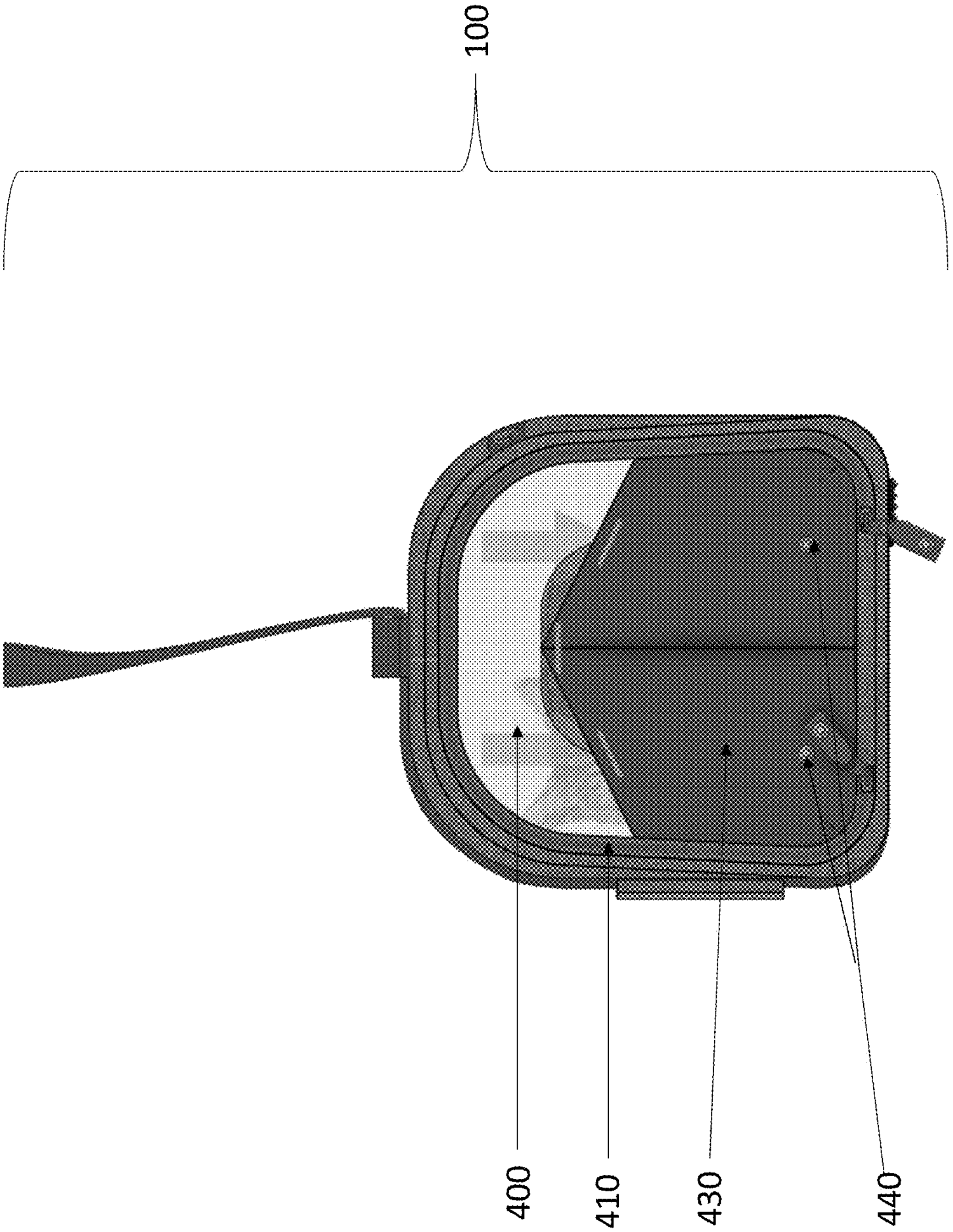
FIG. 2 is a left side view of a preferred embodiment of the present apparatus with a fully padded structure with a mesh side opening and a side pocket.

FIG. 2 is a preferred embodiment of the pet carrier 100, the pet carrier 100 further comprising a left side 400 made of breathable mesh configured to dynamically open and close by unzipping the left side zip 410. The left side 400 further comprises a side pockets 430. The side pockets 430 are configured with a snap button mechanism 440 configured to dynamically lock the left side zip 410 and secure the pet inside the pet carrier 100.

Figure 3:
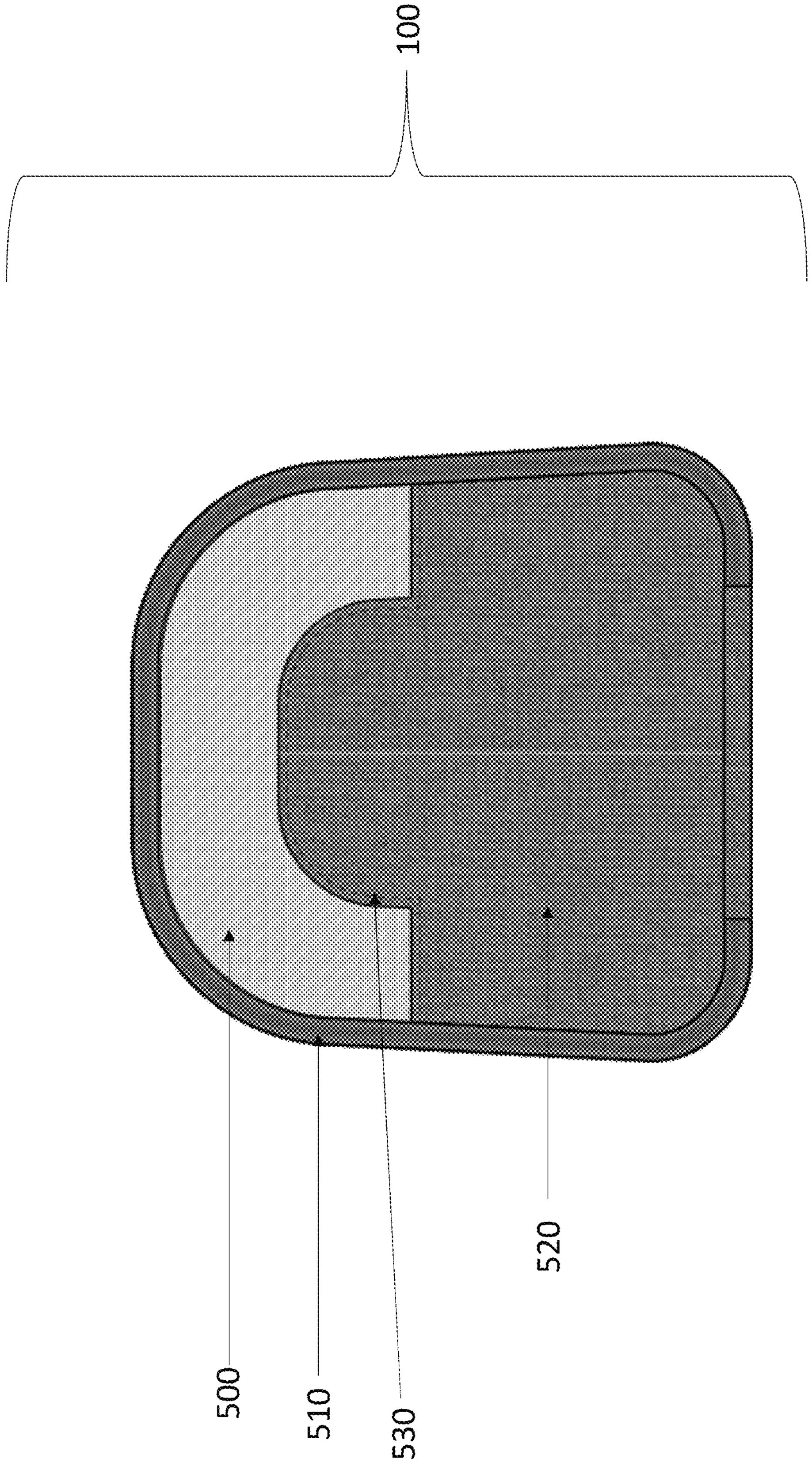
FIG. 3 is a right side view of a preferred embodiment of the present apparatus with a fully padded structure with a mesh side opening and an organizer pocket detail.

FIG. 3 is a preferred embodiment of the pet carrier 100, the pet carrier 100 further comprising a right side 500 made of breathable mesh configured to dynamically open and close by unzipping the right side zip 510. The right side 500 further comprises an organizer pocket 520, the organizer pocket 520 configured with zip 530 to dynamically open and close the organizer pocket 520. The organizer pocket 520 is configured with a snap button mechanism 540 configured to dynamically lock the right side zip 510 and secure the pet inside the pet carrier 100.

Figure 4:
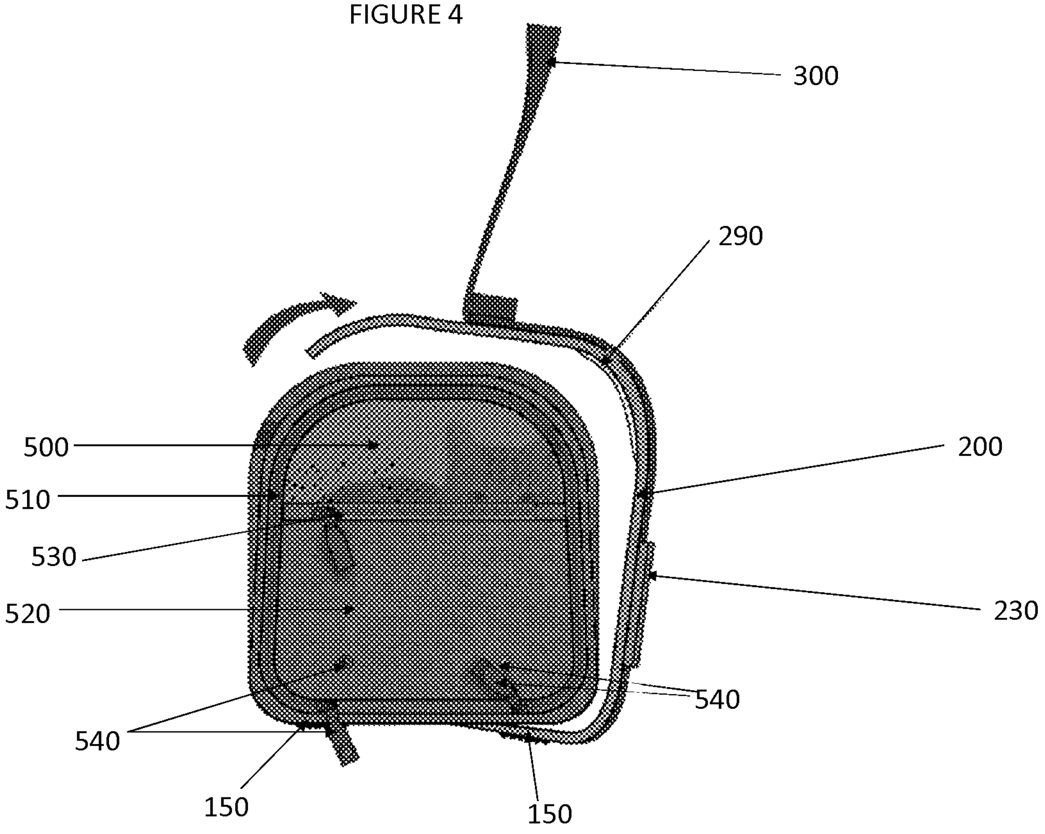
FIG. 4 is a right side and back view of a preferred embodiment of the present apparatus showing a back opening comprising a pass through for a luggage handle and an odor elimination pocket.

FIG. 4 is preferred embodiment of the pet carrier 100, the pet carrier 100 further comprising the back flap 200 and the webbing handle 300 configured to dynamically adjust to the user's preference. The back flap 200 further comprises a luggage handle 230 configured to allow a luggage handle of a suitcase to pass through and secure the pet carrier 100 to the suitcase for easy transport of the pet carrier 100 on top of the suitcase.

The pet carrier 100 further comprises a rubber foot 150 sewn to the bottom of the pet carrier 100. The rubber foot 150 is sewn in each corner of the bottom 140 to protect the pet carrier 100 from anything it may be placed upon.

Figure 5:
FIG. 5 is a right side view of a preferred embodiment of the present apparatus showing a strap as a backpack.

FIG. 5 is a preferred embodiment of the pet carrier 100 where the webbing handle 300 is in a backpack configuration 160 for the user to wear the pet carrier 100 across their back.

Figure 6:
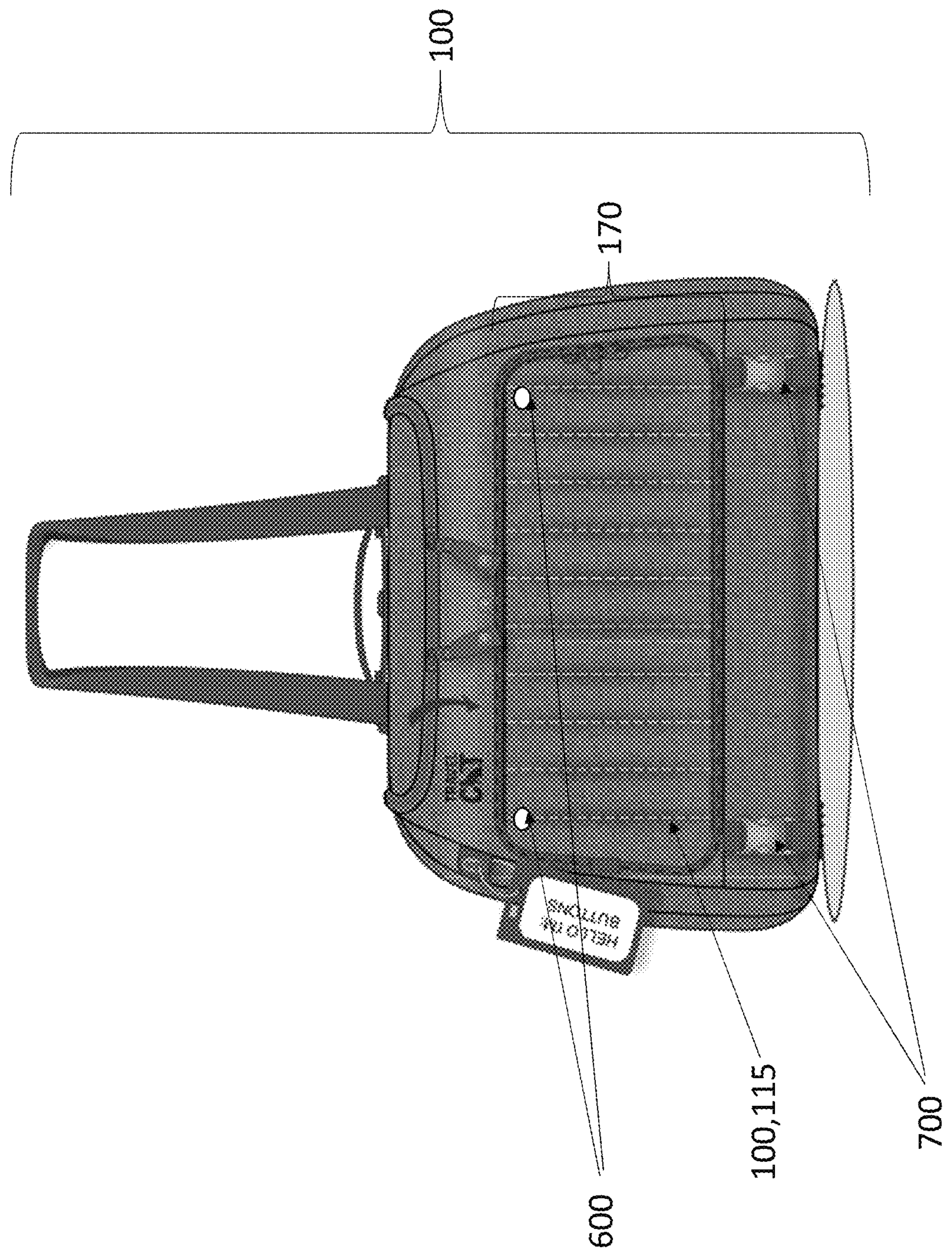
FIG. 6 is a front view of a preferred embodiment of the present apparatus showing a mesh opening with the window curtain in a closed configuration.

FIG. 6 is a preferred embodiment of the pet carrier 100 where the window 110 with the window curtain 115 in a closed configuration 170. The closed configuration 170 is held in position with a magnetic mechanism 600.

The pet carrier 100 further comprises two car seat buckles 700 on the bottom front of the pet carrier 100. The car seat buckles 700 are configured to lock the pet carrier 100 into a car seat for safe transportation of the pet carrier 100 in a car.

Figure 7:
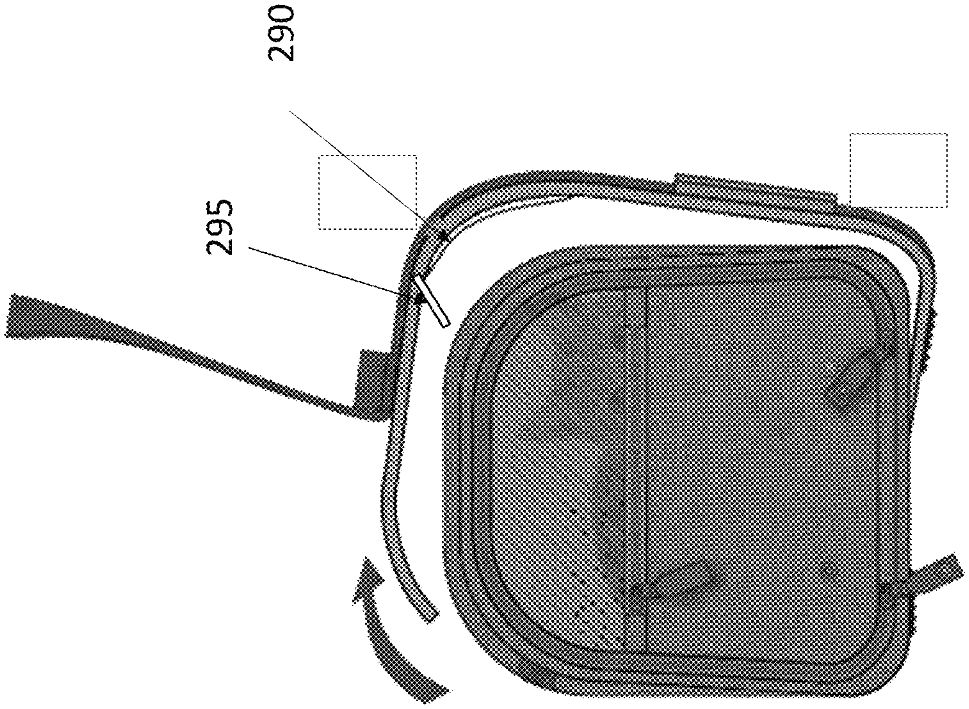
FIG. 7 is a right side view of a preferred embodiment of the present apparatus showing the back flap in a pet pad configuration.

FIG. 7 is a preferred embodiment of the pet carrier 100 where the back flap 200 is configured to dynamically unfold and lay flat in a pet pad configuration. The back flap 200 preferably comprises an odor eliminator pocket 290 made of mesh and configured to house an odor eliminating packet. The back flap 200 preferably further comprises a bungee leash 295 sewn to the inside of the back flap 200 to further secure the pet inside of the pet carrier 100.

Figure 8A:
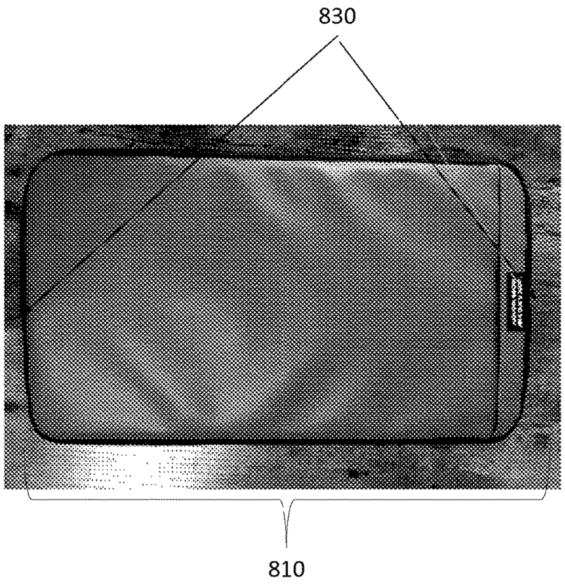
FIGS. 8A and 8B are perspective views of a removable and replaceable waterproof bed pad of the present apparatus.
Figure 8B:
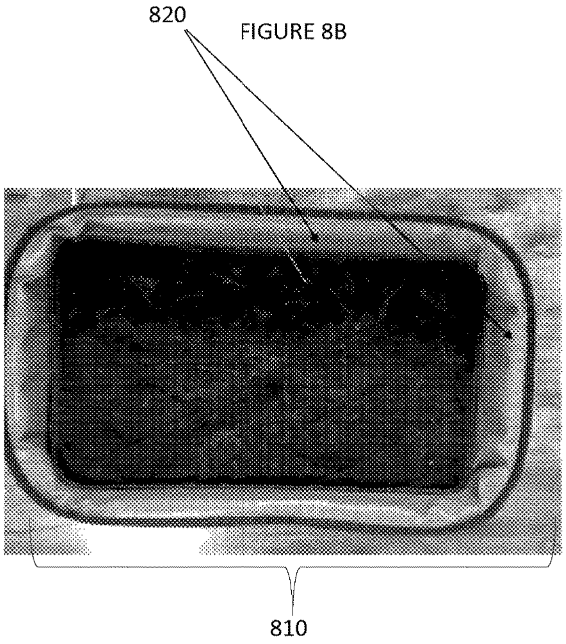

FIGS. 8A and 8B are a preferred embodiment of a removable and replaceable bed pad 810 which is housed in the main cavity 800 of the pet carrier 100. The bed pad 810 is preferably waterproof and made of a fleece fabric on one side, and coated tarpaulin on the other side. The bed pad 810 is configured with thick walls 820 for added comfort, and tubular handles 830 for easy removal and installation.

What is claimed is:

1. A pet carrier device comprising:

a main cavity for housing a small pet, the main cavity comprising a bed pad, the bed pad comprising:

a set of walls to form a rectangular shape, and tubular handles on short sides of the bed pad;

a window made of breathable mesh configured to dynamically open and close by a main zip opening;

wherein the window has a window curtain that attaches and detaches to the pet carrier through a magnetic mechanism;

a padded back flap configured to unfurl into a pet pad configuration, wherein the padded back flap further comprises:

a luggage flap to receive a handle of a suitcase to slide through and secure the pet carrier in place, and an odor elimination pocket to house an odor eliminating packet; and a handle configured to adjust to a desired length and configuration of a user.

2. The pet carrier of claim 1, wherein the pet carrier comprises a left side which opens and closes by a left zip opening, the left side comprising:

a mesh window;

the zip opening configured to open and close the mesh window, and a side pocket comprised of a snap mechanism to further secure the zip opening in a closed position.

3. The pet carrier of claim 1, wherein the pet carrier comprises a right side which opens and closes by a right zip opening, the right side comprising:

a mesh window;

the zip opening configured to open and close the mesh window, and a side pocket comprised of a snap mechanism to further secure the zip opening in a closed position.

4. The pet carrier of claim 1, wherein the pet carrier comprises a rubber foot on a bottom of the pet carrier.

5. The pet carrier of claim 1, wherein the front of the pet carrier comprises two car seat buckles to lock the pet carrier in place for transportation in a car.

* * * * *